United States Patent
Lioy et al.

(10) Patent No.: US 8,898,323 B2
(45) Date of Patent: Nov. 25, 2014

(54) MOBILITY PROTOCOL SELECTION IN A MULTI-INTERNET PROTOCOL MOBILITY ENVIRONMENT

(75) Inventors: Marcello V. Lioy, San Diego, CA (US); Jun Wang, La Jolla, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1279 days.

(21) Appl. No.: 12/561,907

(22) Filed: Sep. 17, 2009

(65) Prior Publication Data

US 2010/0100631 A1    Apr. 22, 2010

Related U.S. Application Data

(60) Provisional application No. 61/107,598, filed on Oct. 22, 2008.

(51) Int. Cl.
| | |
|---|---|
| G06F 15/16 | (2006.01) |
| H04L 29/06 | (2006.01) |
| H04W 12/06 | (2009.01) |
| H04W 80/04 | (2009.01) |

(52) U.S. Cl.
CPC ............... *H04L 69/16* (2013.01); *H04W 12/06* (2013.01); *H04L 69/18* (2013.01); *H04L 69/24* (2013.01); *H04W 80/045* (2013.01)
USPC .......................................... 709/229; 709/230

(58) Field of Classification Search
CPC ......... H04L 69/18; H04L 69/16; H04L 69/24; H04L 61/2007; H04W 12/06; H04W 80/045; H04W 80/04
USPC .......................................................... 709/229
See application file for complete search history.

(56) References Cited

U.S. PATENT DOCUMENTS

| | | |
|---|---|---|
| 6,978,128 B1 | 12/2005 | Raman et al. |
| 7,254,119 B2 | 8/2007 | Jiang et al. |

(Continued)

FOREIGN PATENT DOCUMENTS

| | | |
|---|---|---|
| CN | 1492615 A | 4/2004 |
| JP | 2003018195 A | 1/2003 |

(Continued)

OTHER PUBLICATIONS

International Search Report and Written Opinion—PCT/US2009/061731, International Searching Authority—European Patent Office, Mar. 18, 2010.

(Continued)

*Primary Examiner* — David Lazaro
*Assistant Examiner* — Xiang Yu
(74) *Attorney, Agent, or Firm* — Darren M. Simon

(57) ABSTRACT

Aspects describe selection of a mobility protocol after a mobile device has been authenticated with a network. Selection of mobility protocol after authentication can mitigate the amount of time needed to implement the mobility protocol. The mobility protocols include a simple IP protocol, a proxy mobile IP protocol, and a client mobile IP protocol. Implementation of simple IP protocol and proxy mobile IP protocol are performed in a similar manner from the perspective of a mobile device. If IPCP negotiation is successful, proxy mobile IP protocol or simple IP protocol can be selected. If IPCP negotiation is not successful, client mobile IP protocol can be selected.

18 Claims, 9 Drawing Sheets

(56) References Cited

U.S. PATENT DOCUMENTS

| | | | |
|---|---|---|---|
| 7,710,964 | B2 | 5/2010 | Patil et al. |
| 2006/0045049 | A1* | 3/2006 | Chung et al. ............ 370/331 |
| 2006/0092878 | A1 | 5/2006 | Shirota et al. |
| 2006/0183472 | A1 | 8/2006 | Nookala et al. |
| 2007/0006281 | A1 | 1/2007 | Abhinkar et al. |
| 2007/0160049 | A1 | 7/2007 | Xie et al. |
| 2007/0208855 | A1 | 9/2007 | Yegani et al. |
| 2007/0254661 | A1* | 11/2007 | Chowdhury et al. ......... 455/436 |
| 2008/0254768 | A1 | 10/2008 | Faccin |
| 2008/0282327 | A1 | 11/2008 | Winget et al. |
| 2010/0017528 | A1 | 1/2010 | Awano |
| 2010/0046434 | A1 | 2/2010 | Weniger et al. |
| 2010/0138651 | A1 | 6/2010 | Wang et al. |

FOREIGN PATENT DOCUMENTS

| | | |
|---|---|---|
| JP | 2009526487 A | 7/2009 |
| TW | 448658 | 8/2001 |
| WO | WO0141470 | 6/2001 |
| WO | WO2007092617 | 8/2007 |

OTHER PUBLICATIONS

"Network PMIP Support" 3rd Generation Partnership Project 2 3GPP2 No. Version 1.0, Dec. 5, 2008, pp. 1-43, XP007912107 sections 3.22 & 4.22.

3GPP2: "cdma2000 Wireless IP Network Standard: Simple IP and Mobile IP Access Services" Feb. 28, 2006, XP002572802 Retrieved from the Internet: URL:http://www.3gpp2.org/Publi c html/specs /X.S0011-002-D_v1.0_060301.pdf> [retrieved on Mar. 11, 2010].

3GPP2: "Network PMIP Support Revision A" 3GPP2-Drafts, 3GPP2 X.S0054-220-A Aug. 29, 2008, XP002572801 Retrieved from the Internet: URL:http://www.3gpp2.org/Publi cjitml/specs /X.S0054-220-A_v1.0_080909.pdf> [retrieved on Mar. 11, 2010] the whole document.

Chiba T et al: "Mobility Management Schemes for Heterogeneity Support in Next Generation Wireless Networks" Next Generation Internet Networks, 3rd Eurongi Conference on, IEEE, PI, May 1, 2007, pp. 143-150, XP031176439 ISBN: 978-1-4244-0856-6 Section V: mobility solutions for roaming scenarios.

Simpson W et al: "The Point-to-Point Protocol (PPP); r f c 1 6 6 1 . t x t" IETF Standard, Internet Engineering Task Force, IETF, CH, Jul. 1, 1994, XP015007448 ISSN: 0000-0003.

3rd Generation Partnership Project 2, cdma2000 Wireless IP network Standard: Simple IP and Mobile IP services, 3GPP2 X.S0011-001-C, V3.0, Oct. 2006.

3rd Generation Partnership Project 2, cdma2000 Wireless IP network Standard: Simple IP and Mobile IP services, 3GPP2 X.S0011-002-C, V3.0, Oct. 2006.

Taiwan Search Report—TW098135818—TIPO—Nov. 6, 2012.

* cited by examiner

MOBILITY PROTOCOL SELECTION IN A MULTI-INTERNET PROTOCOL MOBILITY ENVIRONMENT

CROSS-REFERENCE

This is an application claiming priority to Provisional Application No. 61/107,598 entitled "AN OPTIMAL METHOD TO SELECT A MOBILITY PROTOCOL IN A MULTI-IP-MOBILITY ENVIRONMENT," filed Oct. 22, 2008, and assigned to the assignee hereof and hereby expressly incorporated by reference herein.

BACKGROUND

I. Field

The following description relates generally to multi-Internet Protocol mobility environments and more particularly to selecting a mobility protocol in a multi-Internet Protocol mobility environment.

II. Background

Wireless communication systems are widely deployed to provide various types of communication and to communicate information regardless of where a user is located (e.g., inside or outside a structure) and whether a user is stationary or moving (e.g., in a vehicle, walking). For example, voice, data, video, and so forth can be provided through wireless communication systems. A typical wireless communication system, or network, can provide multiple users access to one or more shared resources. A system can use a variety of multiple access techniques such as Frequency Division Multiplexing (FDM), Time Division Multiplexing (TDM), Code Division Multiplexing (CDM), Orthogonal Frequency Division Multiplexing (OFDM), 3GPP Long Term Evolution (LTE), and others.

Some communications network support multiple mobility protocols, such as Simple IP Protocol, Proxy Mobile IP Protocol, and Client Mobile IP Protocol. In these networks, a protocol is selected before authentication of a mobile device is performed. Therefore, protocol selection is before mobile device and network have communicated capabilities and data related to services and other information necessary for proper communication exchange. Therefore, if a protocol is selected that is not adequate, not supported, or due to other considerations is not appropriate, execution of that protocol is discarded. In this case, another protocol has to be selected and authentication and other procedures must be carried out for the newly selected protocol. This can result in a cumbersome process, an increase in the time needed to establish communication through a mobility protocol, as well as other problems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect relates to a method for selecting mobility protocols in a multi-Internet Protocol mobility environment. Method can include employing a processor executing computer executable instructions stored on a computer readable storage medium to implement the following acts of method. Method includes performing an authentication of a mobile device in multi-Internet Protocol mobility environment and conducting an Internet Protocol Control Protocol negotiation with mobile device. Method also includes selecting a mobility protocol from a plurality of mobility protocols, wherein selecting is a function of a success or a failure of Internet Protocol Control Protocol negotiation. Further, method includes executing the selected mobility protocol within multi-Internet Protocol mobility environment, wherein the authentication performed before selecting the mobility protocol is used for executing the selected mobility protocol. According to an aspect, selecting the mobility protocol from the plurality of mobility protocols comprises selecting a proxy mobile IP protocol or a simple IP protocol if the Internet Protocol Control Protocol negotiation is successful. In another aspect, selecting the mobility protocol from the plurality of mobility protocols comprises selecting a client mobile IP protocol if the Internet Protocol Control Protocol negotiation is not successful.

A further aspect relates to a wireless communications apparatus that includes a memory and a process. Memory retains instructions related to authenticating a mobile device in a multi-Internet Protocol mobility environment and selecting a mobility protocol from a plurality of mobility protocols after authenticating mobile device. Memory also retains instructions related to executing within multi-Internet Protocol mobility environment the selected mobility protocol, wherein the authentication performed before selecting the mobility protocol is used for executing the selected mobility protocol. Processor is coupled to memory and is configured to execute instructions retained in memory.

Another aspect relates to a wireless communications apparatus that selects a mobility protocol. Apparatus includes means for authenticating a mobile device within a multi-Internet Protocol mobility environment and means for choosing one mobility protocol from a plurality of mobility protocols after authenticating mobile device. Apparatus also includes means for implementing within multi-Internet Protocol mobility environment the one mobility protocol chosen using the authentication performed before means for choosing the one mobility protocol chooses the one mobility protocol. According to some aspects, apparatus includes means for notifying mobile device of the one mobility protocol chosen Still another aspect relates to a computer program product comprising a computer-readable medium. Included in computer-readable medium is a first set of codes for causing a computer to authenticate a mobile device in a multi-Internet Protocol mobility environment. Also included in computer-readable medium is a second set of codes for causing computer to select one mobility protocol from a plurality of mobility protocols after performing authentication and a third set of codes for causing computer to notify mobile device of the one mobility protocol selected. Computer-readable medium also includes a fourth set of codes for causing computer to execute within multi-Internet Protocol mobility environment the one mobility protocol selected using the authentication of mobile device performed by first set of codes.

Another aspect relates to at least one processor configured to select a mobility protocol. Processor includes a first module for authenticating a mobile device within a multi-Internet Protocol mobility environment and a second module for choosing one mobility protocol from a simple IP protocol, a proxy mobile IP protocol, or a client mobile IP protocol. Processor also includes a third module for implementing within multi-Internet Protocol mobility environment the one mobility protocol selected using the authentication performed before second module chooses the mobility protocol.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
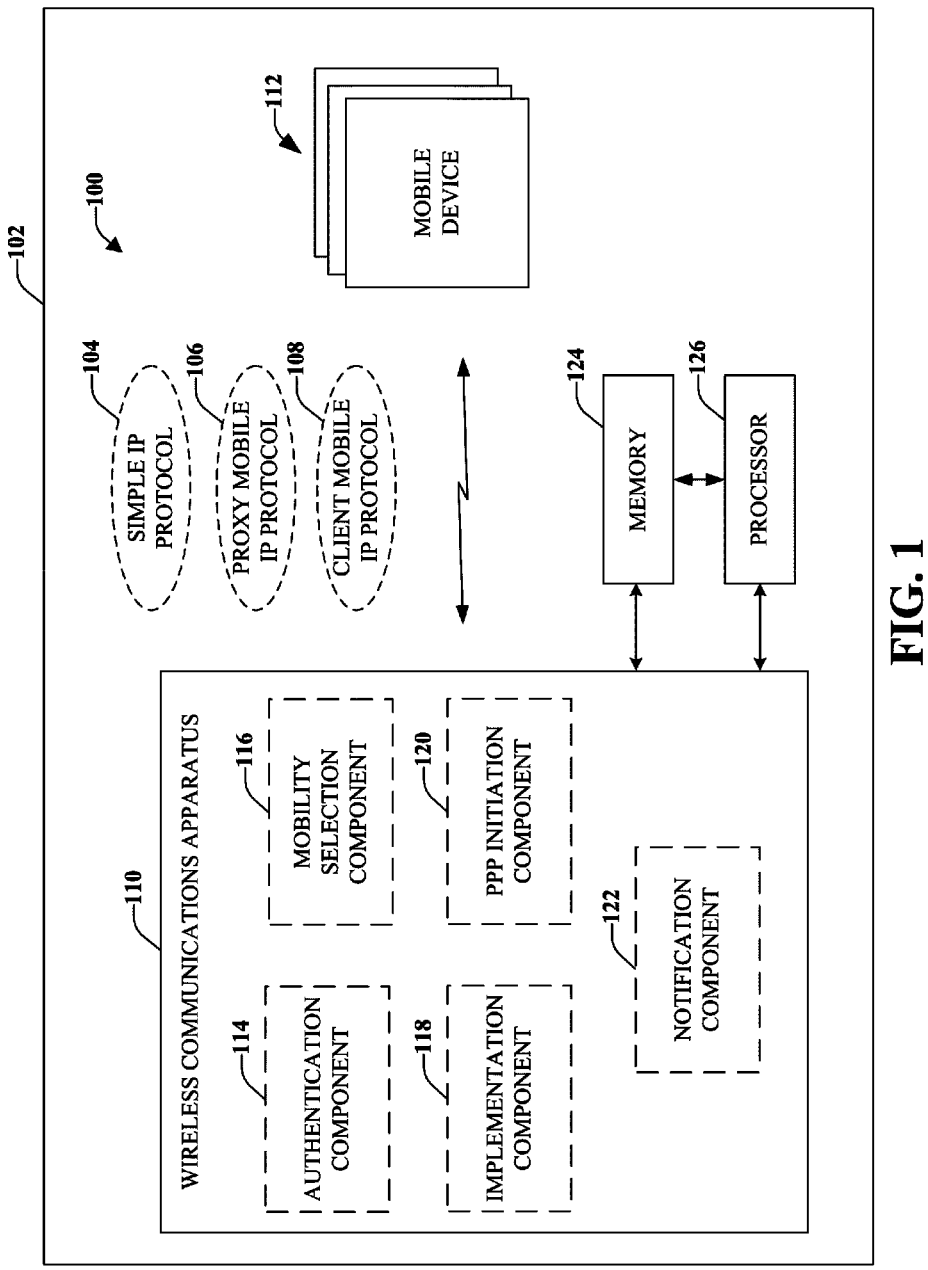
FIG. 1 illustrates a system that selects a mobility protocol in a multi-Internet Protocol mobility environment, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

With reference to FIG. 1, illustrated is a system 100 that selects a mobility protocol in a multi-Internet Protocol (IP) mobility environment, according to an aspect. Introduction of new mobility protocols poses a challenge for selecting a valid mobility protocol in an efficient manner in an environment where only selected deployed systems might be upgraded to use new mobility protocols and other, non-selected systems continue to use mobility protocols already in use. For example, in conventional systems, the selection can be based on an operator policy, and, based on the policy, there might be a different order of priority in selecting mobility protocols. In another example, choice of a less preferred mobility protocol and, a further selection of another mobility protocol in conventional systems generally require a renegotiation of steps that were already executed, which is inefficient. System 100 is configured to mitigate renegotiation of steps that were already executed, according to one or more aspects.

In Third ($3^{rd}$) Generation Partnership Project 2 (3GPP2), for example, there are two mobility protocols for IPv4 (Internet Protocol Version 4), which are Proxy Mobile IP and Client Mobile IP. Proxy Mobile IP is a network-based mobility management that enables the same functionality as Mobile IP. However, Proxy Mobile IP can be utilized without modifications to mobile device's Transmission Control Protocol/Internet Protocol (TCP/IP) Protocol stack. Thus, a mobile device can change its point-of-attachment to the Internet without changing the IP address of the mobile device. A mobile device that supports a MIP stock can utilize Client Mobile IP. Further, with Client Mobile IP, mobile device can interact with mobility agents in a home network and in a foreign network. Additionally, Simple-IP is also available.

According to some aspects, the order of priority of protocol selection might be as follows. First Proxy Mobile IP is selected, if not available (or if there is a failure), then Client Mobile IP is selected. If Client Mobile IP is not available (or if there is a failure), then Simple IP is selected.

System 100 can be included in a multi-IP mobility environment 102 in which multiple mobility protocols can be utilized, such as a Simple IP Protocol 104, a Proxy Mobile IP Protocol 106, and/or a Client Mobile IP Protocol 108. System 100 includes a wireless communications apparatus 110, which represents a network, or, in accordance with some aspects, a base station. Wireless communications apparatus 110 communicates with a plurality of mobile devices 112. Wireless communications apparatus 110 sends data to mobile devices 112 over a downlink and receives data from mobile devices 112 over an uplink. Included in wireless communications apparatus 110 is an authentication component 114 that is configured to perform authentication of one or more mobile devices 112. A multitude of techniques can be utilized to perform authentication in accordance with the disclosed aspects and, since any of these techniques can be utilized, further information related to these techniques will not be provided herein.

A mobility selection component 116 is configured to select one mobility protocol from a plurality of mobility protocols. Such mobility protocols can include Simple IP protocol 104, Proxy Mobile IP protocol 106, and/or Client Mobile IP protocol 108. Mobility selection component 116 is configured to receive an indication from authentication component 114 that a particular mobile device from the plurality of mobile devices 112 has been authenticated. Based on this authentication, mobility selection component 116 selects one of the mobility protocols as the preferred mobility protocol. If authentication of mobile device is not successful, mobility selection component 116 does not receive an indication from authentication component 114. In accordance with some aspects, if authentication is not successful, authentication component 114 notifies mobility selection component 116 of the unsuccessful attempt to authenticate mobile device, and, therefore, mobility selection component 116 does not select a mobility protocol for that mobile device and a default protocol can be utilized, such as simple IP protocol 104.

Also included in wireless communications apparatus 110 is an implementation component 118 that is configured to execute, within multi-IP mobility environment 102, the selected (or default) mobility protocol. In accordance with some aspects, if the mobility protocol selected is proxy mobile IP protocol 106, implementation component 118 receives an Internet Protocol Control Protocol (IPCP) configure request (e.g., IP-Add Configuration) and replies to the request by transmitting an IPCP configure acknowledgement (e.g., IP-Add Configuration).

According to some aspects, the mobility protocol selected is client mobile IP protocol 108. In accordance with this aspect, implementation component 118 receives an IPCP configure request (e.g., IP-Add Configuration) and replies by transmitting an IPCP configure negative acknowledgement (NAK). Thereafter, client mobile IP protocol registration occurs to allow mobile device to communicate over Client Mobile IP Protocol 108.

Additionally, wireless communications apparatus 110 can include a point-to-point protocol (PPP) component 120 that is configured to initiate point-to-point protocol before authentication component 114 attempts to authenticate mobile device.

In accordance with some aspects, wireless communications apparatus 110 includes a notification component 122 that is configured to advise mobile device of the mobility protocol chosen by mobility selection component 116. Notification component 122 can provide information related to the selected mobility protocol before implementation component 118 executes the mobility protocol within multi-IP mobility environment 102.

System 100 can include memory 124 operatively coupled to wireless communications apparatus 110. Memory 124 can be external to wireless communications apparatus 110 or can reside within wireless communications apparatus 110. Memory 124 can store information related to authenticating mobile devices 112 in a multi-IP mobility environment 102, selecting one mobility protocol from a plurality of mobility protocols after performing authentication, and executing within multi-IP mobility environment 102 the one mobility protocol selected. The authentication performed (before selecting the mobility protocol) is used for executing the selected mobility protocol, such that a second (or subsequent) authentication does not need to be performed, in accordance with the aspects disclosed herein.

In accordance with some aspects, instructions related to selecting one mobility protocol select the one mobility protocol from a Simple IP protocol 104, a Proxy Mobile IP protocol 106, and a Client Mobile IP protocol 108. In accordance with some aspects, memory 124 retains further instructions related to notifying a mobile device of the mobility protocol selected before executing the mobility protocol within the multi-IP mobility environment 102.

According to an aspect, selection of mobility protocol can be a function of a success or a failure of an Internet Protocol negotiation. Thus, memory 124 can retain further instructions related to conducting an Internet Protocol Control Protocol negotiation with mobile device. For example, a proxy mobile IP protocol is selected or a simple IP protocol is selected if the Internet Protocol Control Protocol negotiation is successful. If the Internet Protocol Control Protocol negotiation is not successful, a client mobile IP protocol can be selected from the plurality of mobility protocols.

In accordance with some aspects, Proxy Mobile IP protocol 106 (or Simple IP protocol 104) is chosen as the mobility protocol for use by mobile device. In this aspect, instructions related to executing the mobility protocol selected include receiving an Internet Protocol Control Protocol (IPCP) configure request and transmitting an IPCP configure acknowledgement.

According to some aspects, Client Mobile IP protocol 108 is chosen as the mobility protocol for use by mobile device. In accordance with this aspect, instructions related to executing the mobility protocol selected include receiving an Internet Protocol Control Protocol (IPCP) configure request, transmitting an IPCP configure negative acknowledgement, and executing a client mobile IP protocol registration.

Memory 124 can also store other suitable information related to signals transmitted and received in a communication network. Memory 124 can store protocols associated with mobility protocol selection, taking action to control communication between wireless communications apparatus 110 and one or more mobile devices 112, and so forth, such that system 100 can employ stored protocols and/or algorithms to achieve improved communications in a wireless network as described herein.

At least one processor 126 can be operatively connected to wireless communications apparatus 110 (and/or memory 124) to facilitate analysis of information related to mobility protocol selection in a communication network. Processor 126 can be a processor dedicated to analyzing and/or generating information received by wireless communications apparatus 110, a processor that controls one or more components of system 100, and/or a processor that both analyzes and generates information received by wireless communications apparatus 110 and controls one or more components of system 100.

In accordance with some aspects, processor 126 is configured to select a mobility protocol in a multi-IP mobility environment 102. Processor 126 can include a first module for authenticating a mobile device within a multi-IP mobility environment 102. Also included is a second module for choosing one mobility protocol from a simple IP protocol 104, a proxy mobile IP protocol 106, and a client mobile IP protocol 108, after performing authentication. Further, processor 126 includes a third module for implementing within multi-IP mobility environment 102 the one mobility protocol selected. This module uses the authentication performed (by first node) to implement the one mobility protocol selected. The mobility protocol selected can be a function of success or failure of an Internet Protocol Control Protocol negotiation with mobile device.

According to an aspect, the one mobility protocol selected is a proxy mobile IP protocol 106 and third module further receives an Internet Protocol Control Protocol (IPCP) configure request and transmits an IPCP configure acknowledgement. According to another aspect, the one mobility protocol is a client mobile IP protocol 108 and third module receives an Internet Protocol Control Protocol (IPCP) configure request, transmits an IPCP configure negative acknowledgement, and executes a client mobile IP protocol registration.

Figure 2:
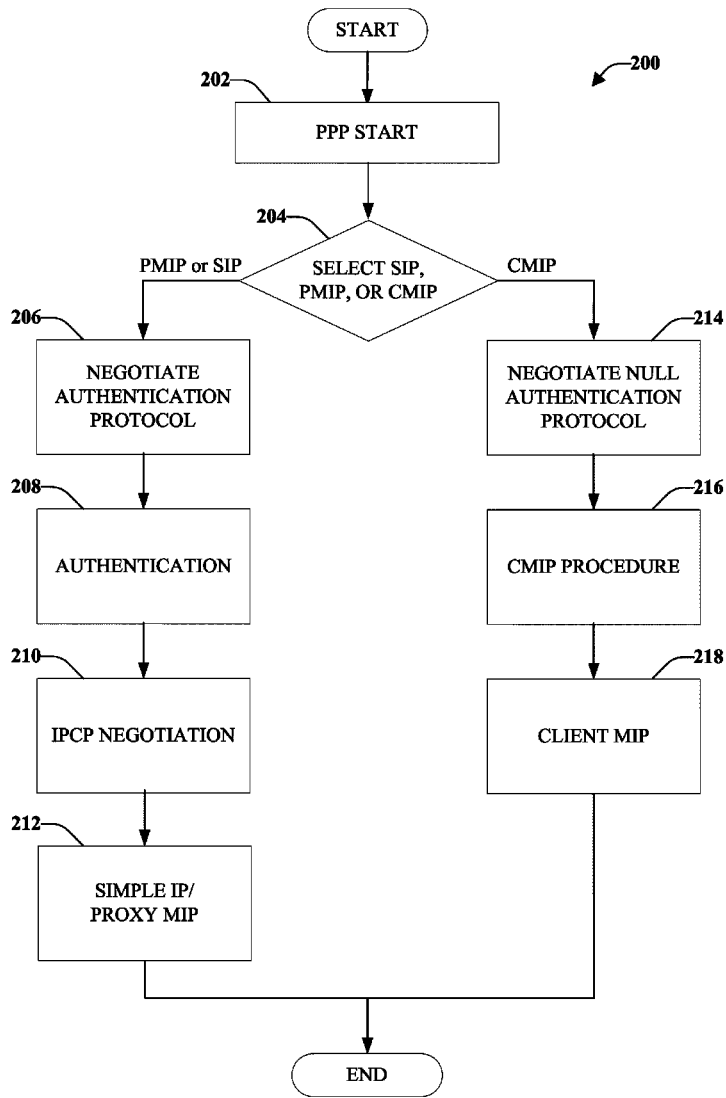
FIG. 2 illustrates a method for a conventional mobility protocol selection procedure.

FIG. 2 illustrates a method 200 for a conventional mobility protocol selection procedure. In view of exemplary systems shown and described herein, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Method 200 includes a procedure for simple-IP and proxy-MIP that are similar from a mobile device point of view. However, mobile device will need to know if the network supports CMIP/PMIP and, therefore, mobile device should be notified of a chosen mobility protocol.

Method 200 starts, at 202, with initiation of a Point-to-Point (PPP) protocol, which is a data link protocol utilized to establish a direct connection between two networking nodes. PPP can be initialized by either network or mobile device. PPP can include a Link Control Protocol (LCP), which provides automatic configuration of interfaces at each end. After the link is established, an Internet Protocol Control Protocol (IPCP) or another protocol can be utilized for additional network configuration, such as obtaining IP addresses. After link establishment and network configured is completed, a mobility protocol is selected, at 204. Selection of a Proxy Mobile IP Protocol (PMIP), a Simple IP Protocol (SIP), and/or a Client Mobile IP Protocol (CMIP) can be based on an operator policy, for example.

If PMIP or SIP is selected, method 200 continues at 206 and an authentication protocol is negotiated. From mobile device point of view, operation of PMIP and SIP is similar with the exception that SIP does not provide mobility. Thus, if SIP is utilized, when mobile device is moved from one region to another region, the IP address is lost and a new IP address needs to be established. If PMIP is selected, mobility is enabled, thus, mobile device can retain its IP address as mobile device is moved from region to region.

At 208, authentication is performed for PMIP and/or SIP. Various techniques can be utilized to perform authentication. At 210, IPCP negotiation is performed. IPCP is the network control protocol phase of IP protocol where mobile device updates the IP address from network. Once IPCP negotiation is completed, mobile device has a valid IP address and is ready to perform communication functions and, at 212, Simple IP and/or Proxy MIP is performed.

Returning to selection, at 204, CMIP might be selected. CMIP is available for regional changes as mobile device moves from region to region. If mobile device wants to utilize the same IP address between regions, mobile device does explicit signaling to perform CMIP. Thus, there are explicit actions mobile device has to perform at the time of regional change. If the selection, at 204, is for CMIP, method 200 continues, at 214, with negotiation of NULL authentication protocol.

At 216, CMIP procedure is performed by method 200. CMIP procedure can include authentication of mobile device, authentication of IP address, binding IP address from home region to another region, and so forth. At 218, Client MIP is conducted.

It should be noted that Simple-IP (SIP) and Proxy Mobile IP (PMIP) procedures are similar from the perspective of mobile device, except that SIP does not provide mobility. Thus, in a situation where a preferred order is first choice is PMIP, second choice is CMIP, and third choice SIP there can be redundancy and delays encountered. For example, if mobile device executes procedure and expects to obtain PMIP, and PMIP is not supported, mobile device needs to execute the procedure from 202 onwards to obtain the next preferred mobility protocol, which, in this case, is CMIP. Thus, this redundancy can be burdensome, can add additional delay, and can negatively impact a user's experience.

Before authentication is performed, mobile device and network are not aware of each other's capabilities. Thus, at times, selection of a mobility protocol, at 204, will not be the correct choice. When selection of PMIP, SIP, and/or CMIP is performed, at 204, mobile device is not aware whether network supports CMIP or PMIP (e.g., capacity of network) and, likewise, network is generally not aware of capabilities and requirements of mobile device. Thus, selection, at 204, can result in a case where mobile device uses a less preferred mobility protocol. As discussed, the decision of which mobility protocol to utilize is performed early in method 200 and the procedure executed is differently depending on whether PMIP/SIP is selected or whether CMIP is selected. If PMIP is selected, at 204, but is not supported by network, method 200 would attempt to continue through IPCP negotiation, at 210. However, a failure will result and method 200 has to return to 202 and select a different mobility protocol, such as CMIP. In a similar manner, if CMIP is selected and fails, then method 200 has to return to 202 and proceed to selection of PMIP or SIP. Thus, as discussed previously, if selection of a mobility protocol by conventional method 200 is incorrect, it can result in a cumbersome process, which increases the time necessary to establish communication, which can negatively impact a user experience.

Figure 3:
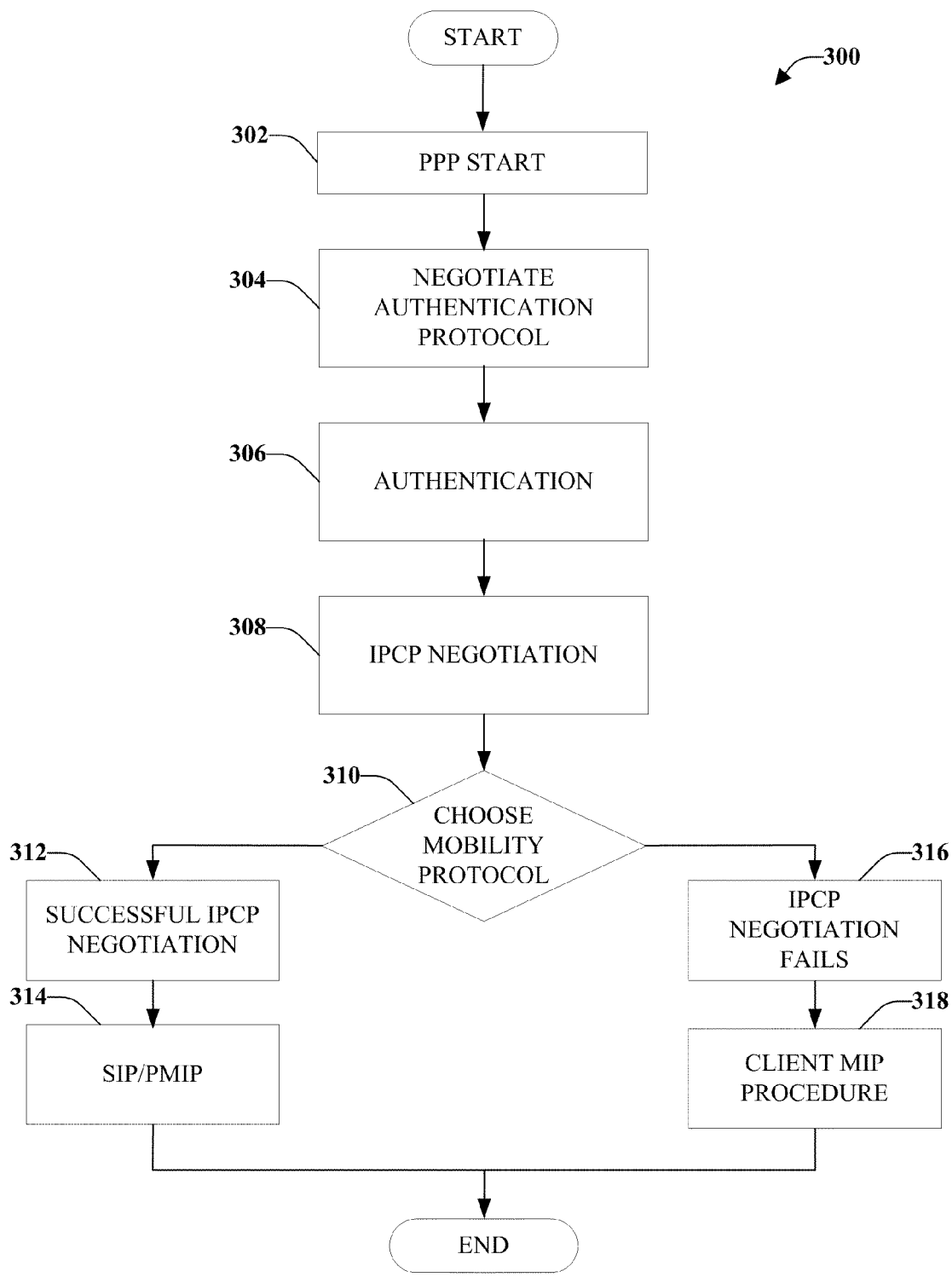
FIG. 3 illustrates a method for mobility protocol selection in a multi-Internet Protocol mobility environment, according to an aspect.

FIG. 3 illustrates a method 300 for mobility protocol selection in a multi-IP mobility environment, according to an aspect. Method 300 selects a mobility protocol after authentication when more information is known about network and mobile device, which can mitigate the time necessary to establish communication in a multi-IP mobility environment.

At 302, PPP is initiated by either mobile device or network. At 304, an authentication protocol is negotiated and, at 306, authentication is performed. IPCP negotiation is performed, at 308. With reference back to method 200 of FIG. 2, authentication protocol negotiation 206, authentication 208 and IPCP negotiation 210 are performed after a mobility protocol (e.g., PMIP, SIP) is selected, at 204, which can be inefficient. Thus, method 300 performs these functions (negotiate authentication protocol 304, authentication 306, and IPCP negotiation 308) early in method 300.

Mobile device performs Simple-IP procedure until IPCP negotiation, at 308. At 304, authentication protocol negotiation, a legacy mobile device that proposes to perform NULL authentication can be directed to use Password Authentication Protocol (PAP) and/or Challenge Handshake Authentication Protocol (CHAP) authentication by a network that is capable of PMIP.

With continuing reference to method 300, a determination of which mobility protocol should be utilized by mobile device is made, at 310. Determination, at 310, is made by network and is made individually for each mobile device. If IPCP negotiation, at 308, is successful, the determination, at 310, is that PMIP and/or SIP should be utilized, and method 300 continues, at 312, with exchange of IPCP Configure-Request and IPCP Configure-ACK messages. SIP or PMIP is employed, at 314.

If IPCP Negotiation, at 308, is not successful, at 310, that determination is that CMIP should be utilized. Thus, at 316, since IPCP negotiation failed, network sends an IPCP-Configuration Negative Acknowledgement (Config-NAK). At 318, Client MIP procedure is utilized. For example, if mobile device receives IPCP-Config-NAK, mobile device can initiate client mobile IP procedure. CMIP procedure can include exchange of Mobile IP Registration Request Message (MIP-RRQ) and Mobile IP Registration Reply Message (MIP-RRP)

In accordance with some aspects, a computer program product can include a computer-readable medium that comprises codes for carrying out various aspects of method 300. Computer-readable medium can include a first set of codes for causing a computer to authenticate a mobile device in a multi-IP mobility environment and a second set of codes for causing the computer to select one mobility protocol from a plurality of mobility protocols after performing authentication. In accordance with some aspects, second set of codes selects one mobility protocol from a simple IP protocol, a proxy mobile IP protocol, and a client mobile IP protocol.

Computer-readable medium can also include a third set of codes for causing computer to notify mobile device of the one mobility protocol selected and a fourth set of codes for causing computer to execute within multi-IP mobility environment the one mobility protocol selected. Fourth set of codes uses the authentication (performed by the first set of codes) for executing the mobility protocol selected. In accordance with some aspects, proxy mobile IP protocol is selected and fourth set of codes further receives an Internet Protocol Control Protocol (IPCP) configure request and transmits an IPCP configure acknowledgement. According to some aspects, client mobile IP protocol is selected and fourth set of codes receives an Internet Protocol Control Protocol (IPCP) configure request, transmits an IPCP configure negative acknowledgement, and executes a client mobile IP protocol registration. Thus, method 300 performs authentication before selection of a mobility protocol (and does not need to perform a subsequent authentication), which can be more efficient as compared to conventional methods (e.g., method 200 of FIG. 2).

Figure 4:
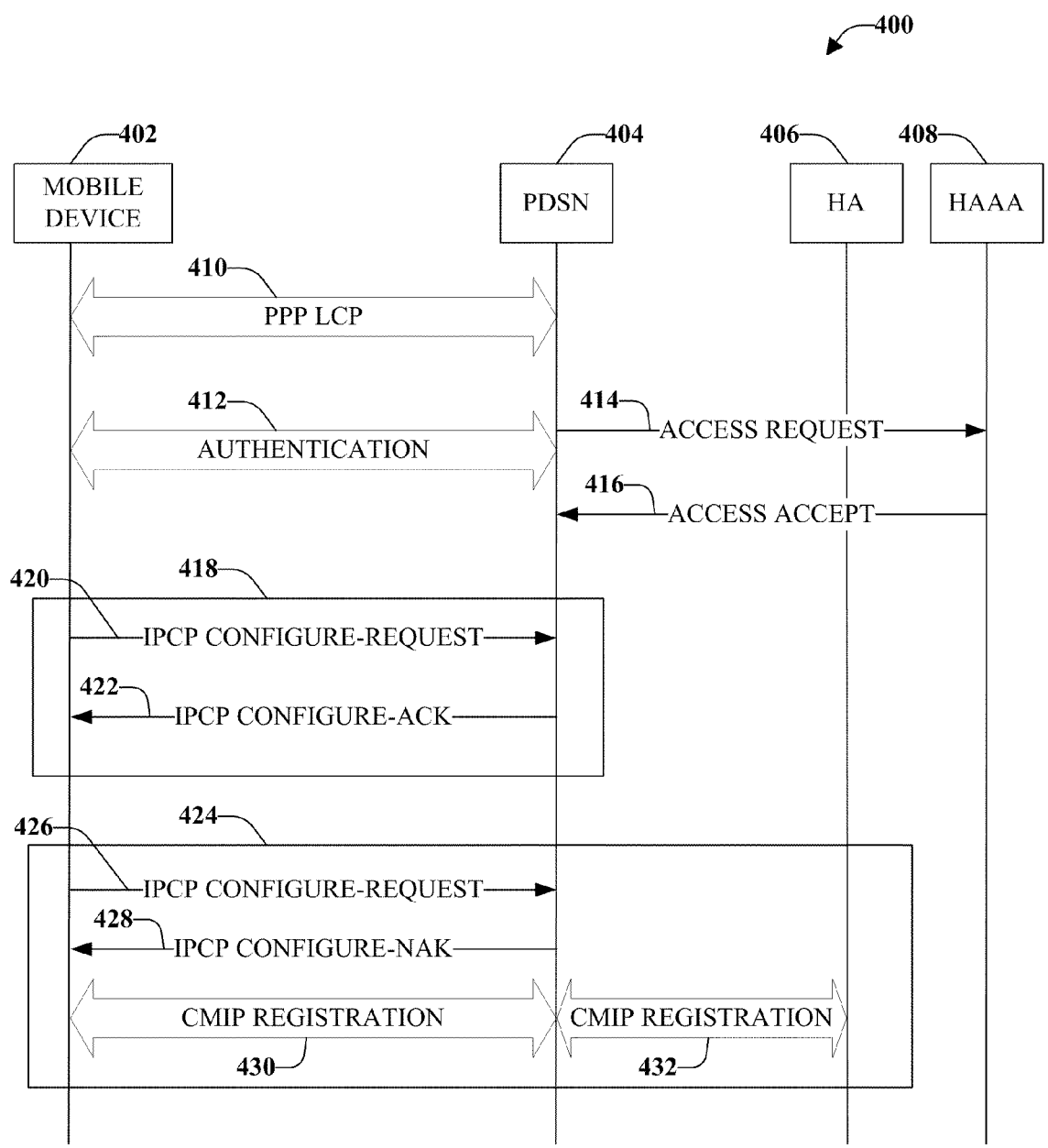
FIG. 4 illustrates an example of a call flow in accordance with various aspects presented herein.

FIG. 4 illustrates an example of a call flow 400 in accordance with the various aspects presented herein. Represented in call flow 400 is a mobile device 402, a Packet Data Serving Node (PDSN) 404, a Home Agent (HA) 406 and a Home Authentication Authorization and Accounting (HAAA) Server 408. PDSN 404 operates as a connection point between mobile device 402 and IP networks. PDSN 404 manages PPP sessions between a mobile device 402 and a provider's core IP network. Home agent 406 is a router on a mobile device's home network and can tunnel packets to mobile device 402 when mobile device 402 is located away from home network. Home agent 406 maintains current location (e.g., IP address) for mobile device 402. HAAA 408 is a server in mobile device's home network and can store user profile information, respond to authentication requests, and collect accounting information.

At 410, a PPP and LCP are performed between mobile device 402 and PDSN 404. Further, authentication 412 is performed between mobile device 402 and PDSN 404. PDSN 404 sends an access request 414 to HAAA 408. HAAA 408 can reply with an Access Accept 416 (e.g., IP Service Authorized Attribute).

If PMIP (or SIP) is authorized (e.g., IPCP negotiation successful), call flow 400 proceeds to block 418 and, an Internet Protocol Control Protocol (IPCP) Configure Request 420 is sent from mobile device 402 to PDSN 404. An IPCP Configure Acknowledgement 422 (IP-Add Configuration) is sent from PDSN 404 to mobile device 402. PMIP (or SIP) is utilized by mobile device 402 to communicate within multi-IP mobility environment.

If PMIP is not authorized, but CMIP is authorized (e.g., IPCP negotiation failed), call flow 400 continues with block 424 (instead of block 418). An Internet Protocol Control Protocol (IPCP) Configure Request 426 is sent from mobile device 402 to PDSN 404. PDSN 404 replies to mobile device 402 with an IPCP Configure Negative Acknowledgement 428. After IPCP Configure Negative Acknowledgement 428 is sent, mobile device 402 and PDSN 404 perform CMIP Registration 430. A CMIP Registration 432 is also performed between PDSN 404 and home agent 406. Mobile device utilizes CMIP within multi-IP mobility environment.

Figure 5:
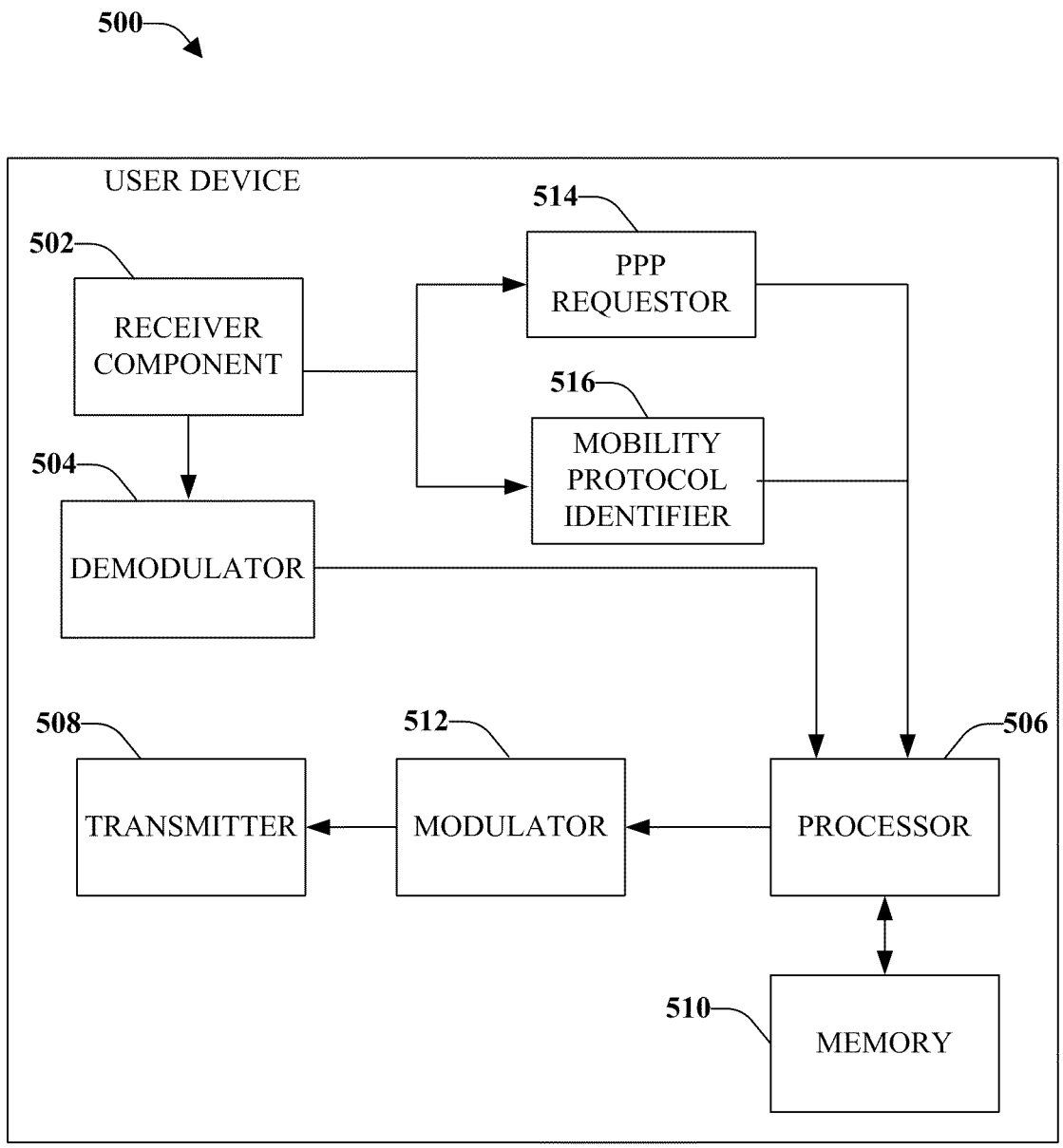
FIG. 5 illustrates a system that facilitates mobility protocol selection in a multi-Internet Protocol mobility environment in accordance with one or more of the disclosed aspects.

With reference now to FIG. 5, illustrated is a system 500 that facilitates mobility protocol selection in a multi-IP mobility environment in accordance with one or more of the disclosed aspects. System 500 can reside in a user device. System 500 comprises a receiver component 502 that can receive a signal from, for example, a receiver antenna. Receiver component 502 can perform typical actions thereon, such as filtering, amplifying, downconverting, and so forth the received signal. Receiver component 502 can also digitize the conditioned signal to obtain samples. A demodulator 504 can obtain received symbols for each symbol period, as well as provide received symbols to a processor 506.

Processor 506 can be a processor dedicated to analyzing information received by receiver component 502 and/or generating information for transmission by a transmitter 508. In addition or alternatively, processor 506 can control one or more components of system 500, analyze information received by receiver component 502, generate information for transmission by transmitter 508, and/or control one or more components of system 500. Processor 506 may include a controller component capable of coordinating communications with additional user devices.

System 500 can additionally comprise memory 510 operatively coupled to processor 506. Memory 510 can store information related to coordinating communications and any other suitable information. Memory 510 can additionally store protocols associated with mobility protocol selection. It will be appreciated that data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 510 of the various aspects is intended to comprise, without being limited to, these and any other suitable types of memory. System 500 can further comprise a symbol modulator 512, wherein transmitter 508 transmits the modulated signal.

Receiver component 502 is further operatively coupled to a PPP Requestor 514 that is configured to initiate a point-to-point (PPP) protocol. However, in accordance with some aspects, a network initiates PPP protocol. Additionally, receiver component 502 can be operatively coupled to a mobility protocol identifier 516 that is configured to receive from network an indication of a mobility protocol selected. The mobility protocol can be selected from a simple IP protocol, a proxy mobile IP protocol, or a client mobile IP protocol. According to various aspects, mobility protocol identifier 516 receives from network an indication that PMIP and/or SIP is selected if IPCP negotiation is successful. If IPCP negotiation is not successful, mobility protocol identifier 516 receives from network an indication that CMIP is selected.

Figure 6:
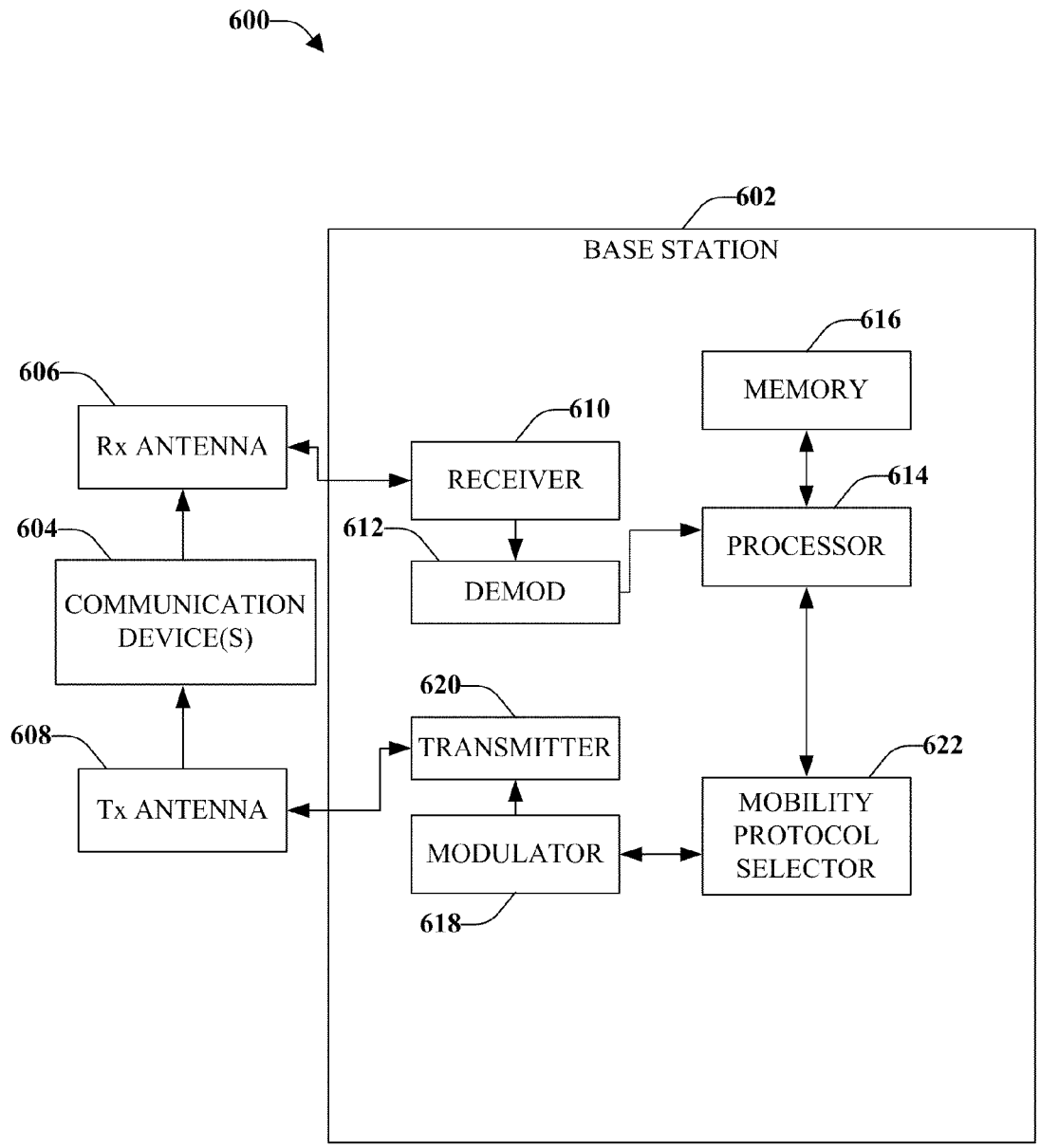
FIG. 6 illustrates a system that facilitates selection of a mobility protocol in a multi-Internet Protocol mobility environment in accordance with various aspects presented herein.

FIG. 6 is an illustration of a system 600 that facilitates selection of a mobility protocol in a multi-IP mobility environment in accordance with various aspects presented herein. System 600 comprises a base station or access point 602. As illustrated, base station 602 receives signal(s) from one or more communication devices 604 (e.g., user device) by a receive antenna 606, and transmits to the one or more communication devices 604 through a transmit antenna 608.

Base station 602 comprises a receiver 610 that receives information from receive antenna 606 and is operatively associated with a demodulator 612 that demodulates received information. Demodulated symbols are analyzed by a processor 614 that is coupled to a memory 616 that stores information related to mobility protocol selection. A modulator 618 can multiplex the signal for transmission by a transmitter 620 through transmit antenna 608 to communication devices 604.

Processor 614 is further coupled to a mobility protocol selector 622 that is configured to select a mobility protocol from a plurality of mobility protocols. For example, mobility protocol selector 622 can select a protocol from a list of a simple IP protocol, a proxy mobility IP protocol, and a client mobile IP protocol. Mobility protocol selector 622 is further configured to select the mobility protocol only after authentication of a communication device 604 completed successfully, according to the various aspects herein. For example, mobility protocol selector 622 selects CMIP as the mobility protocol for a particular communication device if IPCP negotiation with that communication device fails. However, if IPCP negotiation with the particular communication device is successful, mobility protocol selector 622 can choose PMIP and/or SIP as the mobility protocol for that communication device.

Figure 7:
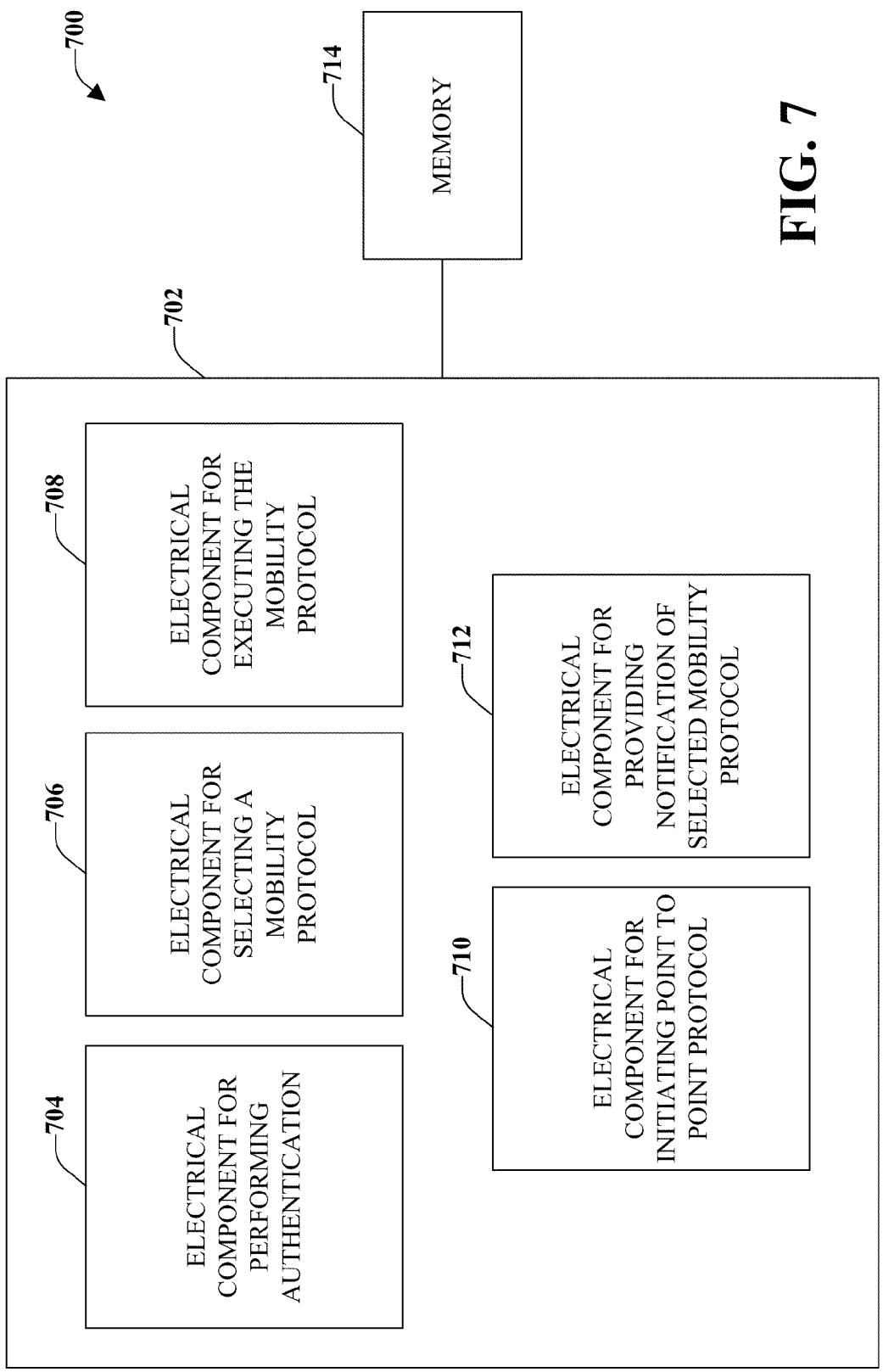
FIG. 7 illustrates an example system that selects a mobility protocol from at least two mobility protocols within a multi-Internet Protocol mobility environment, according to an aspect.

With reference to FIG. 7, illustrated is an example system 700 that selects a mobility protocol from at least two mobility protocols within a multi-IP mobility environment, according to an aspect. System 700 may reside at least partially within a network. It is to be appreciated that system 700 is represented as including functional blocks, which may be functional blocks that represent functions implemented by a processor, software, or combination thereof (e.g., firmware).

System 700 includes a logical grouping 702 of electrical components that can act separately or in conjunction. Logical grouping 702 may include an electrical component 704 for performing authentication of a mobile device in a multi-IP mobility environment. Also included is an electrical component 706 for selecting one mobility protocol from a plurality of mobility protocols after performing authentication successfully. In accordance with some aspects, electrical component 706 for selecting one mobility protocol from a plurality of mobility protocols selects the one mobility protocol from a simple IP protocol, a proxy mobile IP protocol, and a client mobile IP protocol. Logical grouping 702 can also include an electrical component 708 for executing, within the multi-IP mobility environment, the mobility protocol selected using the authentication performed before the means for choosing the one mobility protocol chooses the one mobility protocol.

If the mobility protocol selected is a proxy mobile IP protocol, electrical component 708 receives an Internet Protocol Control Protocol (IPCP) configure request and transmits an IPCP configure acknowledgement. If the mobility protocol selected is a client mobile IP protocol, electrical component 708 receives an Internet Protocol Control Protocol (IPCP) configure request. Further, if the client mobile IP protocol is selected, electrical component 708 transmits an IPCP configure negative acknowledgement and executes a client mobile IP protocol registration.

In accordance with some aspects, logical grouping 702 can include an electrical component 710 for initiating a point-to-point protocol before performing authentication in multi-IP mobility environment. Alternatively or additionally, logical grouping 702 includes an electrical component 712 for notifying mobile device of the one mobility protocol selected before executing the one mobility protocol within the multi-IP mobility environment.

In an example, if the Internet Protocol Negotiation fails, such as for a legacy device, that legacy device will fall back to an existing procedure. However, if the Internet Protocol Negotiation succeeds, such as for a new device, it is an indication to proceed with proxy mobile IP protocol, for example.

Additionally, system 700 can include a memory 714 that retains instructions for executing functions associated with electrical components 704, 706, 708, 710, and 712 or other components. While shown as being external to memory 714, it is to be understood that one or more of electrical components 704, 706, 708, 710, and 712 may exist within memory 714.

Figure 8:
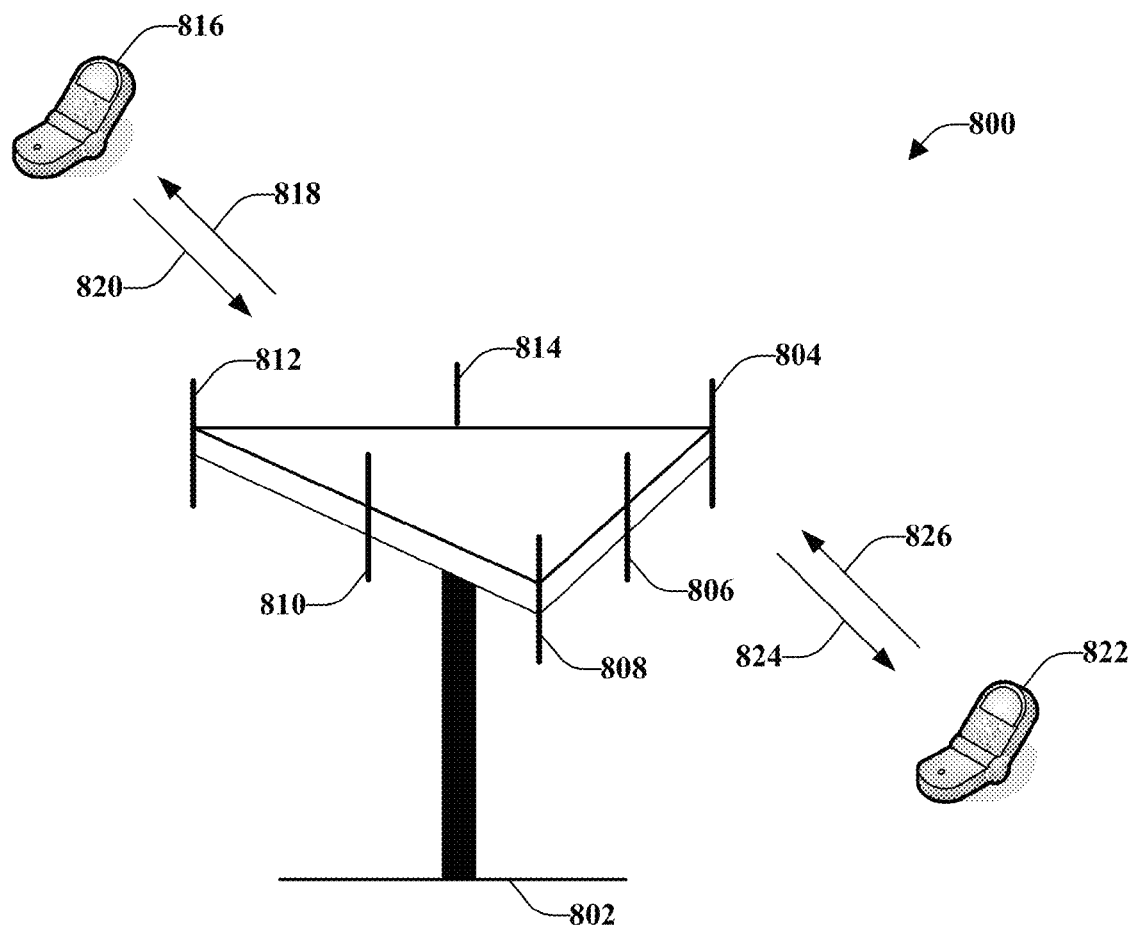
FIG. 8 illustrates a multiple access wireless communication system according to one or more aspects.

Referring now to FIG. 8, a multiple access wireless communication system 800 according to one or more aspects is illustrated. A wireless communication system 800 can include one or more base stations in contact with one or more user devices. Each base station provides coverage for a plurality of sectors. A three-sector base station 802 is illustrated that includes multiple antenna groups, one including antennas 804 and 806, another including antennas 808 and 810, and a third including antennas 812 and 814. According to the figure, only two antennas are shown for each antenna group, however, more or fewer antennas may be utilized for each antenna group. Mobile device 816 is in communication with antennas 812 and 814, where antennas 812 and 814 transmit information to mobile device 816 over forward link 818 and receive information from mobile device 816 over reverse link 820. Forward link (or downlink) refers to communication link from base stations to mobile devices, and reverse link (or uplink) refers to communication link from mobile devices to base stations. Mobile device 822 is in communication with antennas 804 and 806, where antennas 804 and 806 transmit information to mobile device 822 over forward link 824 and receive information from mobile device 822 over reverse link 826. In a FDD system, for example, communication links 818, 820, 824, and 826 might utilize different frequencies for communication. For example, forward link 818 might use a different frequency than the frequency utilized by reverse link 820.

Each group of antennas and/or the area in which they are designated to communicate may be referred to as a sector of base station 802. In one or more aspects, antenna groups each are designed to communicate to mobile devices in a sector or the areas covered by base station 802. A base station may be a fixed station used for communicating with mobile devices.

In communication over forward links 818 and 824, transmitting antennas of base station 802 can utilize beamforming in order to improve a signal-to-noise ratio of forward links for different mobile devices 816 and 822. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 9:
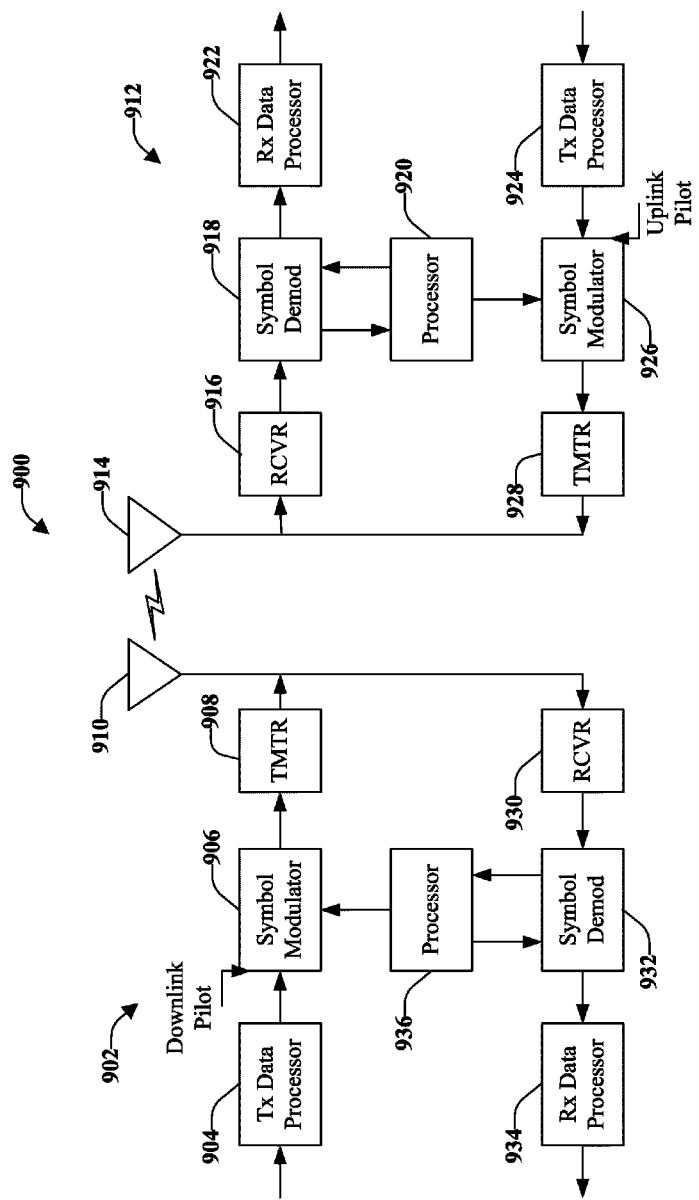
FIG. 9 illustrates an exemplary wireless communication system, according to various aspects.

FIG. 9 illustrates an exemplary wireless communication system 900, according to various aspects. Wireless communication system 900 depicts one base station and one terminal for sake of brevity. However, it is to be appreciated that system 900 can include more than one base station or access point and/or more than one terminal or user device, wherein additional base stations and/or terminals can be substantially similar or different from the exemplary base station and terminal described below. In addition, it is to be appreciated that base station and/or terminal can employ various aspects described herein to facilitate wireless communication there between.

On a downlink, at access point 902, a transmit (TX) data processor 904 receives, formats, codes, interleaves, and modulates (or symbol maps) traffic data and provides modulation symbols ("data symbols"). A symbol modulator 906 receives and processes data symbols and pilot symbols and provides a stream of symbols. Symbol modulator 906 multiplexes data and pilot symbols and obtains a set of N transmit symbols. Each transmit symbol may be a data symbol, a pilot symbol, or a signal value of zero. Pilot symbols may be sent continuously in each symbol period. Pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 908 receives and converts the stream of symbols into one or more analog signals and further conditions (e.g., amplifies, filters, frequency upconverts, and so on) analog signals to generate a downlink signal suitable for transmission over wireless channel. Downlink signal is then transmitted through an antenna 910 to terminals. At terminal 912, an antenna 914 receives downlink signal and provides a received signal to a receiver unit (RCVR) 916. Receiver unit 916 conditions (e.g., filters, amplifies, frequency downconverts, and so forth) received signal and digitizes conditioned signal to obtain samples. A symbol demodulator 918 obtains N received symbols and provides received pilot symbols to a processor 920 for channel estimation. Symbol demodulator 918 further receives a frequency response estimate for the downlink from processor 920 and performs data demodulation on received data symbols to obtain data symbol estimates (which are estimates of transmitted data symbols). Further, symbol demodulator 918 provides data symbol estimates to a RX data processor 922, which demodulates (e.g., symbol demaps), deinterleaves, and decodes the data symbol estimates to recover transmitted traffic data. Processing by symbol demodulator 918 and RX data processor 922 is complementary to processing by symbol modulator 906 and TX data processor 904, respectively, at access point 902.

On uplink, a TX data processor 924 processes traffic data and provides data symbols. A symbol modulator 926 receives and multiplexes data symbols with pilot symbols, performs modulation, and provides a stream of symbols. A transmitter unit 928 receives and processes the stream of symbols to generate an uplink signal, which is transmitted by antenna 914 to access point 902.

At access point 902, uplink signal from terminal 912 is received by antenna 910 and processed by a receiver unit 930 to obtain samples. A symbol demodulator 932 processes the samples and provides received pilot symbols and data symbol estimates for uplink. A RX data processor 934 processes data symbol estimates to recover traffic data transmitted by terminal 912. A processor 936 performs channel estimation for each active terminal transmitting on uplink.

Processors 936 and 920 direct (e.g., control, coordinate, manage, and so forth) operation at access point 902 and terminal 912, respectively. Respective processors 936 and 920 can be associated with memory units (not shown) that store program codes and data. Processors 936 and 920 can also perform computations to derive frequency and impulse response estimates for uplink and downlink, respectively.

For a multiple-access system (e.g., FDMA, OFDMA, CDMA, TDMA, and the like), multiple terminals can transmit concurrently on uplink. For such a system, pilot subbands may be shared among different terminals. Channel estimation techniques may be used in cases where pilot subbands for each terminal span the entire operating band (possibly except for band edges). Such a pilot subband structure would be desirable to obtain frequency diversity for each terminal. The techniques described herein may be implemented by various means. For example, these techniques may be implemented in hardware, software, or a combination thereof. For a hardware implementation, processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, or a combination thereof. With software, implementation can be through modules (e.g., procedures, functions, and so on) that perform functions described herein. Software codes may be stored in memory unit and executed by processors 936 and 920.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The invention claimed is:

1. A method for selecting mobility protocols in a multi-Internet Protocol mobility environment by employing a processor executing computer executable instructions stored on a computer readable storage medium, comprising the steps of:
   authenticating a mobile device in the multi-Internet Protocol mobility environment;
   conducting an Internet Protocol Control Protocol (IPCP) negotiation with the mobile device;
   selecting a proxy mobile Internet Protocol (IP) protocol or a simple IP protocol when the IPCP negotiation is successful;
   selecting a client mobile IP protocol when the IPCP negotiation is not successful; and
   executing a selected IP protocol within the multi-Internet Protocol mobility environment.

2. The method of claim 1, further comprising selecting an existing protocol when the Internet Protocol Control Protocol negotiation fails or selecting the proxy mobile IP protocol when the Internet Protocol Control Protocol negotiation succeeds.

3. The method of claim 1, wherein executing the selected IP protocol further comprises:
   receiving an IPCP configure request; and
   transmitting an IPCP configure acknowledgement when the selected IP protocol is the proxy mobile IP protocol or the simple IP protocol.

4. The method of claim 1, wherein executing the selected IP protocol further comprises:
   receiving an IPCP configure request; and
   transmitting an IPCP configure negative acknowledgement when the selected IP protocol is the client mobile IP protocol.

5. The method of claim 4, further comprising executing a client mobile IP protocol registration when the selected IP protocol is the client mobile IP protocol.

6. The method of claim 1, further comprising:
   notifying the mobile device of the selected IP protocol before executing the selected IP protocol within the multi-Interact Protocol mobility environment.

7. A wireless communications apparatus, comprising:
   at least one processor; and
   a memory coupled to the at least one processor, wherein the at least one processor is configured to:
      authenticate a mobile device in a multi-Internet Protocol mobility environment, conduct an Internet Protocol Control Protocol (IPCP) negotiation with the mobile device, select a proxy mobile Internet Protocol (IP) protocol or a simple IP protocol when the IPCP negotiation is successful, select a client mobile IP protocol when the IPCP negotiation is not successful, and selecting a mobility protocol from a plurality of mobility protocols after authenticating the mobile device, and executing execute a selected IP protocol within the multi-Internet Protocol mobility environment.

8. The wireless communications apparatus of claim 7 wherein the at least one processor is further configured to select an existing protocol when the IPCP negotiation fails or select the proxy mobile IP protocol when the IPCP negotiation succeeds.

9. The wireless communications apparatus of claim 7, wherein the at least one processor configured to execute the selected IP protocol is further configured to receive an IPCP configure request, and transmit an IPCP configure acknowledgement when the selected IP protocol is the proxy mobile IP protocol or the simple IP protocol.

10. The wireless communications apparatus of claim 7, wherein the at least one processor configured to execute the selected IP protocol is further configured to receive an IPCP configure request, and transmit an IPCP configure negative acknowledgement when the selected IP protocol is the client mobile IP protocol.

11. The apparatus of claim 10, wherein the at least one processor is further configured to execute a client mobile IP protocol registration when the selected IP protocol is the client mobile IP protocol.

12. The wireless communications apparatus of claim 7, wherein the at least one processor configured to notify the mobile device of the selected IP protocol before executing the selected IP protocol within the multi-Internet Protocol mobility environment.

13. A computer program product recorded on a non-transitory computer-readable medium and executable on a computer, comprising:
   a set of codes for causing a computer to authenticate a mobile device in a multi-Internet Protocol mobility environment;

a set of codes for causing a computer to conduct an Internet Protocol Control Protocol (IPCP) negotiation with the mobile device;

a set of codes for causing a computer to select a proxy mobile Internet Protocol (IP) protocol or a simple IP protocol when the IPCP negotiation is successful;

a set of codes for causing a computer to select a client mobile IP protocol when the IPCP negotiation is not successful; and a set of codes for causing the computer to execute a selected IP protocol within the multi-Internet Protocol mobility environment.

14. The computer program product of claim 13, further comprising a set of codes for causing a computer to select an existing protocol when the IPCP negotiations fails or select the proxy mobile IP when the IPCP negotiation succeeds.

15. The computer program product of claim 13, wherein the set of codes for causing the computer to execute a selected IP protocol further comprises a set of codes to receive an IPCP configure request, and a set of codes to transmit an IPCP configure acknowledgement when the selected IP protocol is the proxy mobile IP protocol or the simple IP protocol.

16. The computer program product of claim 13, wherein the set of codes for causing the computer to execute a selected IP protocol further comprises a set of codes to receive an IPCP configure request, and a set of codes to transmit an IPCP configure negative acknowledgement when the selected IP protocol is the client mobile IP protocol.

17. The computer program product of claim 16, further comprising a set of codes to execute a client mobile IP protocol registration when the selected IP protocol is the client mobile IP protocol.

18. The computer program product of claim 13, further comprising a set of codes to notify the mobile device of the selected IP protocol before executing the selected IP protocol within the multi-Internet Protocol mobility environment.

\* \* \* \* \*